United States Patent Office 3,001,951
Patented Sept. 26, 1961

3,001,951
PREPARATION OF CATALYST WITH REMOVAL OF HALIDE
Erik Tornqvist, Westfield, and Arthur W. Langer, Jr., Plainfield, N.J., assignors to Esso Research and Engineering Company, a corporation of Delaware
No Drawing. Filed Mar. 7, 1958, Ser. No. 719,981
7 Claims. (Cl. 252—429)

This invention relates to an improved method of preparing catalysts used in the low pressure polymerization of alpha olefins. More particularly it relates to a process for preparing the so-called "preformed" catalysts while removing metal halides formed during the reaction.

The low pressure polymerization of alpha olefins with catalyst systems made up of a reducible heavy transition metal compound and a reducing metal containing compound, hereinafter referred to as A.M. (alkyl metal) catalysts, to high density isotactic, high molecular weight, solid, relatively linear products has been assuming ever increasing importance and is now well known, see e.g. Belgium Patent 533,362, "Chemical and Engineering News," April 8, 1957, pages 12 through 16, and "Petroleum Refiner," December 1956, pages 191 through 196.

The alpha olefinic feeds utilized in polymerization and copolymerization include ethylene, propylene, butene-1, heptene-1, dodecene-1, etc. with ethylene and propylene preferred.

The conditions conveniently utilized are temperatures in the range of about 0° to 150° C. with intermediate temperatures preferred; pressures employed have varied from subatmospheric to 250 atmospheres with more moderate pressures, about 1–10 atmospheres, preferred.

In some cases, particularly the polymerization of propylene, it has been found desirable to utilize "preformed" catalysts, i.e., those in which a heavy transition metal halide is subjected to a preliminary reduction to a lower valence state prior to admixture wth the activating reducing metal containing compound. In this way more crystalline catalyst systems are usually obtained which in turn result in the production of more crystalline polymers. For example, $TiCl_4$ has been reduced to $TiCl_3$, $TiCl_2$ or even lower in the preparation of preformed catalyst systems.

Pure reduced transition metal halides of this type can be prepared from the unreduced halides by several methods known in the art, i.e., by reduction with the corresponding transition metals or with hydrogen or by thermal decomposition at high temperatures. Very high temperatures are required in all these cases. For instance hydrogen reduction of $TiCl_4$ to $TiCl_3$ usually requires a temperature of at least 650° C. Under these conditions only partial reduction takes place and the original product obtained contains large amounts of $TiCl_4$ in addition to some $TiCl_2$ formed by thermal decomposition of $TiCl_3$ during the reduction. As $TiCl_4$ present in the $TiCl_3$ has a detrimental effect on catalyst activity and polymer properties, a thorough washing of the preparation is necessary before it can be used as a catalyst component for polymerization of alpha olefins to polymers having a highly regular structure. Similarly, the reduction of $TiCl_4$ to $TiCl_3$ using titanium powder as the reducing agent requires temperatures of about 450° to 500° C. and may not go to completion unless even higher temperatures are employed. The product obtained is usually a very coarse material which will show but little activity as a catalyst component for polymerization of alpha olefins at moderate pressures unless it has been given extensive further treatment. In addition the free titanium metal which is present in the catalyst when only a partial reaction has taken place is difficult to remove from the polymer formed, resulting in a polymer of a high ash content. The high temperature disproportionation of $TiCl_4$ results in a mixture of $TiCl_2$, $TiCl_3$ and $TiCl_4$ and requires temperatures of above about 1,000° C. The yield of $TiCl_3$ is usually low and extensive washing of the product is necessary to obtain a catalyst component of acceptable properties.

Even more difficult is the reduction of transition metal halides to a valence state more than one unit below the normal maximum one. Thus the preparation of $TiCl_2$ from $TiCl_4$ by metal or hydrogen reduction is much more complicated and can as a rule not be made unless very high temperatures, above about 700° C., are used. As a matter of fact most processes suggest temperatures of about 1000° to 1200° C. and in some cases the use of a molten salt bath is suggested for homogenization of the reaction mixture. At these temperatures both $TiCl_3$ and $TiCl_2$ have an appreciable vapor pressure and among others the following equilibrium exists:

$$2TiCl_3 \rightarrow TiCl_4 + TiCl_2$$

This has been made use of for the preparation of $TiCl_2$ from $TiCl_3$ at temperatures of about 600° C. and at very low pressures, below about 1 mm. Hg.

High temperature preparations of this type normally pose great technical problems. In addition, the temperature used in the preparation of reduced transition metal halide has a great influence upon its degree of crystallinity and particle size. In general, both the degree of crystallinity and particle size increase with increasing temperature although other factors such as reduction time and inclusion of other compounds in the crystal lattice play an important role too. Very often the reactivity of catalysts depend to a large extend upon their crystallinity and their particle size. Normally preparations of the type mentioned above made at lower temperatures show greater catalyst activity although their stability may be lower.

Thus it is desirable for many reasons, and in some cases even necessary, to be able to use lower temperatures of preparation than in the methods described above in order to obtain a reduced transition metal halide of defined composition.

A more complete reduction of $TiCl_4$ and other transition metal derivatives to the next lower valence state can be accomplished at lower temperatures by using certain metals as the reducing agents as described in copending patent application Serial No. 578,198, filed April 16, 1956. Thus $TiCl_4$ can be reduced completely to $TiCl_3$ by aluminum powder at a temperature of about 200° C. In this case traces of $AlCl_3$ initially formed probably serve as a catalyst for the reduction by dissolving some elemental aluminum and thereby increasing its reactivity. This is indicated by the fact that the reduction of $TiCl_4$ with aluminum powder will proceed faster when some $AlCl_3$ is added at the beginning of the reaction although a complete reaction can be obtained eventually at the same low temperature, about 200° C. with or without the addition of $AlCl_3$.

It has now been found that also certain other metals than aluminum which form fairly low melting halides will easily and completely reduce transition metal halides like $TiCl_4$ to lower valence state compounds provided the temperatures employed are above the melting point of the corresponding halide formed from the reducing metal. Among these metals can be mentioned: Zn, Cd, Hg, B, Ga, Sn, Pb, Sb and Bi. Surprisingly enough, it has also been found that the reduction can also be carried further than to a valence state one unit below that of the normal maximum valence of the transition metal compound without using appreciably higher temperatures than those needed for the reduction of only one valence unit. However, in all these cases the halide formed from the reducing metal will contaminate and in some cases even co-crystallize with the reduced transition metal halide. This halide will in most cases react with the reducing metal compound used for activating the transition metal halide for use as an olefin polymerization catalyst according to the following type examples:

(1) $2AlCl_3 + AlR_3 \rightarrow 3AlRCl_2$
(2) $AlCl_3 + 2AlR_3 \rightarrow 3AlR_2Cl$
(3) $AlCl_3 + AlR_2Cl \rightarrow 2AlRCl_2$
(4) $MgCl_2 + MgR_2 \rightarrow 2MgRCl$
(5) $ZnCl_2 + AlR_3 \rightarrow ZnRCl + AlR_2Cl$ This results in the consumption of some of the activator and is undesirable in most cases. For instance $AlR_3$ has been found to be a better activator for $TiCl_3$ than the corresponding alkyl aluminum halides in most cases when propylene is to be polymerized at moderate pressures. As a matter of fact very little catalyst activity for polymerizing this monomer is usually found at atmospheric pressure with a combination of $AlR_2Cl$ and $TiCl_3$, whereas a combination of $AlR_3$ and $TiCl_3$ may give quite good polymerization rates under suitable atmospheric conditions. The presence of $AlCl_3$ and similar halides will therefore increase the amount of activator needed for activation of the transition metal halide. In the specific case of a $TiCl_3$ preparation containing co-crystallized $AlCl_3$, the Al trialkyl will react with the $AlCl_3$ until all of the latter has been converted into $AlR_2Cl$ and has gone into solution. As aluminum dialkyl halides show little or no activation of the catalyst at atmospheric pressure, enough Al trialkyl must be added so that it can convert the $AlCl_3$ to $AlR_2Cl$ and leave an additional amount to activate the $TiCl_3$ catalyst.

The following type formula will demonstrate this more clearly:

(6) $TiCl_3 + mAlCl_3 + (n+2m)AlEt_3 \rightarrow$
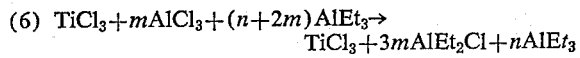
$TiCl_3 + 3mAlEt_2Cl + nAlEt_3$ In this case $n$ must have a value above 0 and preferably correspond to the lowest one at which maximum catalyst activity is obtained.

In other cases where an alkyl aluminum halide such as $AlR_2Cl$ or $AlRCl_2$ may act as a suitable activator, a sufficient amount of a corresponding aluminum compound containing more alkyl groups may have to be added in order to convert $AlCl_3$ into $AlR_2Cl$ or $AlRCl_2$ according to equations 1 to 3. Free $AlCl_3$ left in the transition metal may cause polymerization by a different mechanism (cationic) than that of the complex alkyl metal activated reduced transition metal containing catalyst previously described, which is generally considered to be anionic in nature. This would normally result in the formation of a polymer of undesirable properties.

$AlCl_3$ may also act as an alkylation catalyst and cause alkylation of the diluent used in which the polymerization is carried out, particularly when this is aromatic in nature. In some other cases $AlCl_3$ may act outright as a catalyst poison.

What has been described above with $AlCl_3$ as an example is of course also true in principle for other metal halides formed from the metals previously mentioned as suitable reducing agents for the preparation of reduced transition metal halides. This would normally prevent the use of these metals for the reduction of transition metal halides in order to prepare so-called "preformed" catalyst components for A.M. polymerization of olefins. It has now been found, however, surprisingly enough, that under certain reaction conditions and by selecting proper metals for the reduction, we can prepare pure or almost pure transition metal halides having good catalyst properties at lower temperatures than was previously thought possible. Obviously this requires the removal from the reduced transition metal halide of almost all of the halide formed from the reducing metal during the catalyst preparation.

However, in some cases only a partial removal of the halide of the reducing metal is desirable. As disclosed in copending patent application Serial No. 578,198, the presence of $AlCl_3$ or similar metal halides, e.g. $AlBr_3$, $MgCl_2$, $MgBr_2$, $ZnCl_2$, etc., has been found surprisingly enough to have a beneficial effect on the activity of the reduced transition metal halide as a catalyst for certain olefin polymerizations such as propylene polymerization when activated by sufficient amounts of an alkyl metal compound, like $Al(C_2H_5)_3$. This increase in polymerization activity is thought to be caused by the improved catalyst dispersion that results from the reaction between the halide of the reducing metal and the activator as indicated in Equation 1 to 5 above. In this way soluble compounds are formed from the halides of the reducing metals, which are intimately mixed with and in some cases even co-crystallized with the reduced transition metal halide. This should result in better catalyst dispersion.

However, also in these cases the presence of $AlCl_3$ in the reduced transition metal halide will require a larger quantity of activator for highest catalyst efficiency. Therefore, the amount of $AlCl_3$ should be kept at the lowest level that can be combined with good catalyst activity. This is usually below the concentration level obtained when using Al or a similar metal alone for the reduction of the transition metal halide, especially when the reduction is carried further than one unit below the normal maximum valence state of the transition metal. Thus the removal of part of the reducing metal halide becomes important in these cases too.

It should be noted, however, that a smaller amount of $AlCl_3$ can be introduced by using for the reduction a mixture of Al and the free transition metal of the compound to be reduced as illustrated by the following equations:

(7) $9TiCl_4 + Ti + 2Al \rightarrow 10TiCl_3 + 2AlCl_3$
(8) $6TiCl_4 + Ti + Al \rightarrow 7TiCl_3 + AlCl_3$
(9) $9TiCl_4 + 2Ti + Al \rightarrow 11TiCl_3 + AlCl_3$ These reactions do not proceed as rapidly or at as low temperatures as the reduction with aluminum metal alone, although they do not by far require as drastic conditions as reduction with titanium metal alone. There is also a much greater tendency for incomplete reaction or for formation of an inhomogeneous product when the metal mixture is used for the reduction, particularly with increasing Ti/Al ratios. This is particularly serious in continuous catalyst preparations where a smoothly running reaction yielding a homogeneous product is essential to good operation. Thus the reduction with an active reducing metal like Al remains the preferred one provided the amount of halide formed can be reduced to a suitable level.

The partial or complete removal of the halide of the reducing metal may be partly or almost completely removed according to a number of methods, all of which yield reduced transition metal halide catalyst components of good properties.

In the preferred method of our invention the reduction of the transition metal halide is carried out by treatment with a finely divided powder of a metal of sufficient reduction power at about 200° to 500° C., at pressures varying from atmospheric and up to about 1000 p.s.i.g. and in an oxygen-free, inert atmosphere. Thus the system is flushed out with an inert gas such as argon, helium, etc. or nitrogen when the reaction conditions are such that the tendency for nitride formation is small. In some cases hydrogen may also be used for this purpose provided the temperature is low enough to prevent any undesirable reduction of the transition metal compound by this element.

The heavy transition metal halides treated are the halides of the transition metals of the IV, V, VI, and VIII groups of the periodic system, e.g., titanium, zirconium, hafnium, thorium, uranium, vanadium, niobium, tantalum, chromium, molybdenum and tungsten, as well as iron and copper, with titanium, vanadium and zirconium usually being the most active of these metals. The chlorides and bromides are generally preferred, although in some cases the iodides may also form good A.M. catalyst compounds. Among the more readily reducible heavy metal compounds are the following: titanium tetrachloride, titanium tetrabromide, titanium tetraiodide, vanadium tetrachloride, zirconium tetrachloride and zirconium tetrabromide.

The finely atomized metals utilized for the reduction are preferentially selected from the group consisting of group IIB, group IIIA, group IVA and group VA metals of the periodic table. Thus among metals that can be used are zinc, mercury, boron, aluminum, gallium, germanium, tin, lead, antimony and bismuth, which form liquid or gaseous halides at the temperatures utilized. Aluminum is particularly preferred.

Several methods of removing the metal halides formed from the reducing metals have been found useful for the preparation of reduced transition metal halide catalyst components according to this invention.

The most simple one, which is especially useful for the more volatile halides of sub-groups IIA and IVA of the periodic table, consists of venting the reaction vessel at the reaction temperature after the reduction has been completed by reducing the pressure sufficiently to allow the volatile halide to evaporate and escape through the exhaust system. In some cases where the tendency for co-crystallization between the volatile halide and the reduced transition metal halide is quite great, as is the case between $AlCl_3$ and $TiCl_3$, a slight increase in temperature may be needed to accomplish practically complete halide removal. This increase in temperature after the reduction has been completed usually does not influence to any appreciable extent the particle size of the reduced transition metal halide and consequently does not have as harmful an effect as the same temperature would have during the reduction. By measuring the escaping gas, it is possible to reduce the content of the volatile halide to any desirable level.

Even lower temperatures can be used for removing the volatile halide directly from the reaction vessel after completion of the reduction if an inert gas is used as carrier for the volatile halide. The gas, which may consist of a noble gas such as helium, argon, neon, etc. or a mixture of such gases or of hydrogen or nitrogen if the temperature is so low that the latter gases do not react with the reduced transition metal halide, is preferentially introduced at the bottom and removed together with the volatilized halide at the top of the reactor. In this way it is usually possible to remove any of the halides formed from the reducing elements used according to this invention at a temperature not exceeding that at which the reduction itself has been carried out.

Another method of removing the volatile halide after the reduction has been completed is cooling at least a part of the top of the reactor to a temperature at which the volatile halide will solidify while the main part of the reactor, containing the reaction products, is kept at a temperature at which the volatile halide has an appreciable vapor pressure. In this case no reduction in pressure is needed. The method is particularly suitable when it is desirable to remove only part of the volatile halide. The removal is of course facilitated by proper equipment design.

The volatile halide can also be removed by a similar method during the reaction provided the unreduced transition metal halide itself does not condense on the cool parts of the reactor under the same conditions. This is of course no problem if the unreduced transition metal halide has a very low vapor pressure at the reduction temperature or if it forms a liquid rather than a solid at the temperature used for the condensation of the volatile halide. Thus $AlCl_3$ can be separated at least in part by this method from a reaction mixture in which $TiCl_4$ is being reduced by aluminum metal.

The removal of volatile halide can also be facilitated by applying vacuum to the reactor after the reduction has been finished. Obviously in that case the equipment has to be designed for such a procedure.

When so desired the removal of halide can be accomplished after the reduction according to any of the above mentioned methods in another piece of equipment than the reactor itself.

The halide formed from the reducing metal may in some cases be removed by extraction with suitable inert solvents rather than by volatilization. Most of the halides exhibiting a fairly high volatility at moderate temperatures, up to about 500° C., also have a fairly high solubility in certain hydrocarbon solvents at elevated temperatures. Aromatic and highly polar solvents, e.g. benzene, toluene, xylene, mesitylene, etc., are particularly useful in this respect. The extraction can be carried out directly in the reactor but is in most cases preferentially carried out in separate equipment.

The halide removal according to any of the methods mentioned is facilitated by good mixing and stirring. In some cases a slight grinding may also be beneficial.

A large number of reducing metal containing compounds can be used to activate the reduced heavy metal compound thus prepared. Among the most valuable are alkyl or aryl aluminum compounds, especially trialkyl aluminum compounds, such as triethyl aluminum, tripropyl aluminum, triisobutyl aluminum, etc. and dialkyl aluminum compounds such as diethyl aluminum halides, diethyl aluminum chloride in particular dipropylhalides, diisobutyl halides, etc. Monoalkyl aluminum compounds can also be used in certain polymerizations. Generally, in addition to trialkyl or aryl aluminum, organo aluminum compounds carrying two or at least one hydrocarbon radical, as well as one or two electrophilic groups, such as halogen, alkoxy, organic nitrogen or sulfur groups, etc. may be used. Instead of the alkyl or aryl aluminum compounds, the corresponding hydrides or mixed hydrides of aluminum may be used.

Systems of aluminum trialkyls and titanium halides are particularly preferred and useful for polymerization of propylene and higher alpha olefins, e.g., aluminum triethyl and reduced titanium tetrachloride. In general, mol ratios of 0.5:1 or higher or aluminum trialkyl to reduced titanium tetrachloride are employed. This amount does of course not include the aluminum trialkyl required for converting any $AlCl_3$ present in the reduced titanium chloride into aluminum diethylchloride as described previously.

The amount of catalyst system used may vary within wide limits depending somewhat on the purity of the olefin feed. Proportions of as little as 0.1 part by weight of catalyst per 1,000 parts by weight of olefin are sufficient if the feed is pure. With olefin feed streams containing about 0.01% of water, oxygen, carbon dioxide or certain other oxygenated compounds, catalyst proportions of about 0.1–10 g. per liter of reaction mixture are usually adequate.

The final (complete) catalysts are, quite generally, prepared by intimately mixing the aluminum and titanium compounds preferably in an organic diluent and in a non-oxidizing atmosphere while stirring. The catalyst components may be mixed at temperatures below those used in the polymerization. This can be accomplished batchwise or continuously. Paraffinic hydrocarbons such as propane, isopentane, heptane, decane or other saturated petroleum or synthetic hydrocarbon oils, e.g. white mineral oil, naphthenes such as methyl cyclohexane or Decalin, aromatics such as benzene, chlorobenzene, xylene, etc. are the most suitable solvents. It is important that a suitably high boiling diluent or a high enough pressure be chosen to maintain the diluent liquid at the temperature employed.

The polymerization reaction itself is preferably carried out while stirring in batch or continuous operation in the diluent used for preparing the complete catalyst or in another added organic diluent. When operating batchwise, olefin introduction is contained until the catalyst is wholly or partially exhausted and the reaction slows down or until changes in the catalyst have taken place which result in the formation of polymers of undesirable properties. Sufficient pressure may be applied during the reaction to maintain the lower boiling diluents in a liquid state. The polymer concentration in the reaction mixture may be about 5 to 40 wt. percent.

Upon completion of the polymerization reaction the catalyst can be completely deactivated, e.g., by the addition of an alcohol, such as methyl alcohol, isopropyl alcohol or n-butyl alcohol, in amounts of about 10 to 100 times the amount of catalyst used. The reaction slurry can then be filtered, the filter cake reslurried in a catalyst solvent, such as dry, concentrated alcohol at about 50° to 100° C. for 15 to 60 minutes, filtered again and the filter cake dried, preferably under reduced pressure. Ash residues in the polymer can be reduced below about 0.05% by this procedure. If necessary, the ash content may be further reduced by aqueous acid treatment, etc., according to methods well known in the art, or by using chelating agents, such as acetylacetone. The organic diluents can be recovered for use in catalyst preparation, polymerization, etc.

The polymers of alpha olefins produced in this manner have molecular weights usually in the range of about 100,000 to 300,000 or even as high as 3,000,000 as determined by the intrinsic viscosity method using the I. Harris correlation (J. Polymer Science 8, 361, 1952). They have a high degree of crystallinity and in the case of polypropylenes a low solubility in n-heptane.

This invention and its advantages will be better understood by reference to the following examples.

EXAMPLE I 142.3 g. (¾ mole) of $TiCl_4$ and 6.75 g. (¼ atom) of atomized aluminum powder were mixed in a 300 ml. steel bomb. The bomb was then sealed and heated under constant rocking to 400° C. for 6 hours. At this time the rocker was stopped with the top of the bomb directed upward. The vent valve of the bomb was opened and $AlCl_3$ vapor allowed to escape. Most of the halide escaped within 5 minutes. The valve was closed and the bomb allowed to rest in the same position for an additional hour while the temperature was maintained at 400° C. The vent valve was then opened for a short period to allow a small amount of vaporized $AlCl_3$ to escape. After closing the valve the bomb was heated for another hour and vented once more with only a small amount of $AlCl_3$ escaping.

After cooling the bomb was removed to a dry box and opened. 120 g. of purple violet, dry, finely divided material was recovered. Elemental analyses showed that the $AlCl_3$ content had decreased from a theoretical value of 25 mole percent to 5.4 mole percent. This corresponded to a removal of about 28 g. $AlCl_3$ and indicated that the reaction had been quantitative.

An attempt was made to make a pure $TiCl_3$ preparation by reduction of $TiCl_4$ with Ti powder at 450° C. under similar conditions was unsuccessful as the reaction did not go to completion and yielded a very coarse material which was badly contaminated both with Ti powder and $TiCl_4$.

EXAMPLE II

An experiment was carried out under conditions similar to those used in Example I but a lower temperature and a shorter reduction time. Thus the reduction was carried out at 250° C. for 3 hours. The $AlCl_3$ was then vented off at 320° C. using the same technique as in Example I. This time 127 g. of a purple violet, finely divided material was recovered. This time elemental analyses showed that the $AlCl_3$ content had been reduced from 25 mole percent to 10.6 mole percent. This corresponds to a removal of about 21 g. $AlCl_3$ and again indicates that a complete reaction had taken place.

An attempt was made to prepare a catalyst of similar composition by reducing $TiCl_4$ with the calculated mixture of aluminum and titanium powders using the same reaction temperature and time. Under these conditions the reaction went to about 90% of completion, leaving a somewhat heterogeneous preparation containing some $TiCl_4$ as well as free Ti powder.

EXAMPLE III

Three 300 ml. steel bombs were charged as in Example I and then heated on a rocker at 200° C. for 3 hours. At this time the rockers were stopped as in Example I and one of the bombs was allowed to cool and then taken into a dry box for recovery of its contents. The other bombs were heated to 320° C. and then vented against atmospheric pressure until no more $AlCl_3$ seemed to escape. The vent valve to one of the bombs was then closed again and this bomb subsequently vented as in Examples I and II. Dry, purified helium gas was introduced at the bottom of the other bomb at a rate of 200 ml./min. for 3 hours at the same temperature. The bombs were then cooled down and taken into the dry box for recovery of their contents.

147 g. of a quantitative yield of a purple, finely divided solid was recovered from the first (unvented) bomb. Elemental analyses showed that it contained 24.42% Ti; 4.66% Al and 70.41% Cl or very close to the theoretical composition obtained upon complete reaction (24.1% Ti, 4.53% Al and 71.4% Cl).

125 g. of purple violet, finely divided material containing 9.7 mole percent $AlCl_4$ was recovered from the second bomb which had been vented at atmospheric pressure.

119 g. of a finely divided, purple violet material containing 5.4 mole percent $AlCl_3$ was recovered from the third bomb which had been purged with dry purified helium during the venting period.

This clearly demonstrates the improved halide removal that results from slow purging with an inert gas at an elevated temperature.

EXAMPLE IV

The very high rate of reaction that can be obtained at a low temperature by using aluminum rather than hydrogen or titanium for the reduction of $TiCl_4$ was demonstrated in the following experiment.

A 300 ml. steel bomb was charged as in Example I. It was then placed in a rocking heating mantle which had been preheated to 250° C. The bomb was then heated rapidly so that 61° C. was reached after 5 minutes, 99° C. after 12 minutes, and 193° C. after 54 minutes. The reaction seemed to start at this point as evidenced by a more rapid temperature increase as recorded on the time-temperature chart. The rate of temperature increase returned to its normal value 11 minutes later when the temperature was 222° C. The bomb was heated for an additional 20 minutes at which time the temperature had reached 248° C. It was then rapidly removed from the heater and cooled in ice water.

149 g., the theoretical yield, of a purple finely divided material having the composition $TiCl_3$—0.33 $AlCl_3$ was recovered.

Thus it is indicated that $TiCl_4$ can be completely reduced by aluminum powder at about 200° C. under above conditions within 10–15 minutes. It is indicated that the real reduction time needed is even lower as the heat capacity of the equipment and the moderate rate of heat transfer will tend to smoothen out and prolong the temperature effect of any burst of heat evolved by a fairly fast reaction.

EXAMPLE V 75 g. of the material produced according to Example

IV having very closely the composition TiCl₃—0.33 AlCl₃ was transferred to a stainless steel container and heated to 400° C. at atmospheric pressure for 3 hours under simultaneous purging with dry, purified argon at a rate of approximately 50 ml/min.

After cooling 54 g. of a very finely divided dark purple material was recovered. It consisted of almost pure TiCl₃ containing only 0.67 mole percent AlCl₃.

Although a fairly high temperature was employed for the halide removal, it should be noted that this part of the process was carried out at atmospheric pressure. The reduction of TiCl₄ to TiCl₃ with titanium powder which requires even higher temperatures must be carried out under an appreciable pressure in order to go to completion and then usually yields a very coarse material as disclosed previously.

EXAMPLE VI 142.4 g. (¾ mole) of TiCl₄ and 13.5 g. (½ atom) of atomized aluminum powder were mixed in a 300 ml. steel bomb and then heated in a rocker to 430° C. for 5 hours as in Example I. The rocker was then stopped with the bomb slanted upward and the temperature was increased to 450° C. The venting valve to the bomb was opened and the AlCl₃ formed allowed to escape. The valve was then closed, after approximately 15 minutes, and the heating continued for two more hours. Repeated venting caused only a small amount of AlCl₃ to escape.

After cooling 86.5 g. of a black finely divided material containing a few porous, easily pulverized lumps was recovered. Elemental analyses of the homogenized material showed the following composition: 39.5% Ti, less than 0.1% Al and 59.5% Cl, which is very close to the theoretical composition of TiCl₂ which is 59.7% Cl and 40.3% Ti. The yield was also close to the theoretical for TiCl₂ (89.1 g.) assuming complete removal of AlCl₃.

Thus it was possible to prepare essentially pure TiCl₂ in almost quantitative yield at about 450° C. by using the method of this invention. This is impossible when using titanium metal for the reduction of TiCl₄. In that case solid TiCl₃ is formed as an intermediate on the reducing metal surface rather than liquid or gaseous AlCl₃. The low vapor pressure of TiCl₃ prevents the reaction from going to completion unless much higher temperatures about 800°–1200° C. are used.

The hydrogen reduction of TiCl₄ to TiCl₂ also requires very high temperatures. The preparation by this method of quite impure TiCl₂ (as evidenced by its violet-black color which indicates the presence of TiCl₃) in poor yields at 875° C. was reported recently in the literature.

EXAMPLE VII

In order to demonstrate that the reduction of TiCl₄ to TiCl₂ with atomized aluminum powder can be accomplished at an even lower temperature than was used in Example VI, the following experiment was carried out.

A 300 ml. bomb was charged and put on a rocking heater as in Example VI. The bomb was then heated to 240° C. for 5 hours. A study of the time-temperature chart revealed that the reaction took place within less than 10 minutes at 190°–210° C. After cooling, the bomb was removed from the rocker and opened in a dry box. 5 g. of essentially pure AlCl₃ had condensed at the top of the bomb and was discarded. The rest of the material which contained traces of TiCl₃ as evidenced by its violet or purple tinge was homogenized in a mortar and put back into the bomb which was transferred to the rocking heater and heated to 225° C. for 4 hours. The rocker was stopped at the beginning of the last hour with the bomb slanting upward in order to allow AlCl₃ to condense at the top of the bomb. After cooling, 115 g. of a very finely divided material having the composition TiCl₂—0.28 AlCl₃ was obtained. In addition 33 g. of almost pure AlCl₃ was recovered at the top of the bomb.

Two reaction periods with intermediate mixing or grinding were employed in this experiment as well as in most other experiments where TiCl₄ was reduced at a moderate temperature, below about 250° C., to a valence state more than one unit below the initial one. This was done in order to secure a complete reaction. However, these reactions would, of course, have been easily carried out in one step in a more suitable type of equipment provided with reasonably good agitation.

EXAMPLE VIII 50 g. of the TiCl₂—0.28 AlCl₃ preparation from Example VII was transferred to a stainless steel container and purged with dry purified argon gas for 4 hours at 370° C. and atmospheric pressure as in Example V.

34.2 g. of a very finely divided material consisting of almost pure TiCl₂ (39.8% Ti, 59.8% Cl and less than 0.1% Al) was recovered.

EXAMPLE IX 189.7 g. (1 mole) TiCl₄ and 18 g. (⅔ atom) atomized aluminum powder were heated at 220° C. for 5 hours in a rocking bomb like in Example VII. The material in the bomb, except for 5.5 g. AlCl₃ which had condensed at the top of the bomb, was then transferred to a ball mill jar and homogenized for 1 day with flint pebbles as the grinding medium. The material was then reheated for 5 hours in the rocking bomb. 170 g. of a black finely divided material having the composition TiCl₂—0.51 AlCl₃ was recovered. 15 g. AlCl₃ which had condensed at the top of the bomb was recovered separately and discarded.

EXAMPLE X

The following experiment was carried out in order to demonstrate the removal of volatile halide that results from cooling the top of the reactor while the rest of the reactor containing the reaction product is maintained at the reduction temperature.

A 300 ml. steel bomb was charged and heated during two periods with intermediate grinding and mixing as in Example VII. At the end of the last heating period the rocker was stopped while the heating was continued for another hour with simultaneous air cooling of the top of the bomb.

After cooling the bomb it was found that 57 g. AlCl₃ had condensed in almost pure form at the top of the bomb. The main product (140 g.) consisted of a very finely divided, black solid having the composition TiCl₂—0.20 AlCl₃.

EXAMPLES XI–XVI

Table I shows data from the preparation of 6 catalysts the composition TiCl$_n$ in which $n$ has the values 2.91, 2.8, 2.67, 2.5 and 2.25. All the preparations were made by reduction of TiCl₄ in a 300 ml. bomb with the stoichiometric amount of aluminum powder as in Example VII. Thus two reaction periods were employed with intermediate mixing and grinding in order to secure a complete reaction. This was desirable because of the lack of agitation in the rocking bombs. The reactions would of course have been easily carried out in one step in a more suitable type of equipment as already mentioned in Example VII. The reaction times employed were of the order of several hours. However, the time-temperature relationship curves of the reactions indicated that they took place in a matter of a few minutes. It should be possible to realize such short reaction times in equipment provided with agitation.

As in Example VII the rockers were stopped at the beginning of the last hour of the second reaction period with the bombs slanting upward in order to allow AlCl₃ to condense at the top of the bombs. The AlCl₃ was then recovered separately. In this way preparations with satisfactory AlCl₃ contents were obtained. Without this procedure very little, if any, AlCl₃ could be removed separately, especially if the top of the bombs were properly insulated to avoid cooling. The remainnig material consisted of very finely divided compounds which were easily removed from the bomb. The reactions were in all cases complete and the yields practically quantitative, small losses occurring during the removal of the materials from the bombs.

The products obtained in this way proved not to be simple mixtures of $TiCl_3$ and $TiCl_2$ containing some $AlCl_3$ but rather to be new and defined compositions of matter in which the two titanium chlorides co-crystallized as evidenced by their X-ray diffraction patterns.

Attempts to prepare similar titanium chlorides of a "mixed" valence state by reduction of $TiCl_4$ with hydrogen or titanium metal were unsuccessful even at temperatures as high as 650° C.

These results demonstrate how in some cases 90–98% of the $AlCl_3$ was removed even after some $AlCl_3$ was removed in direct connection with the preparation itself. In general the efficiency of the removal increased with increasing temperature and time as well as with decreasing pressure. The temperature seemed to be the most important one of these variables.

Table II also indicates that the volatile halide is most easily removed from the titanium chlorides in the lower valence states. This is probably a result of the fact that $AlCl_3$ cocrystallizes much more readily with the isomorphous $TiCl_3$ than with $TiCl_2$.

*Table I (Examples XI–XVI)*

PREPARATION a OF $TiCl_n$ CATALYSTS BY ALUMINUM REDUCTION WITH SUBSEQUENT PARTIAL $AlCl_3$ REDUCTION

| Example No. | XI | XII | XIII | XIV | XV | XVI |
|---|---|---|---|---|---|---|
| Ti chloride to be formed | $TiCl_{2.91}$ | $TiCl_{2.8}$ | $TiCl_{2.67}$ | $TiCl_{2.67}$ | $TiCl_{2.5}$ | $TiCl_{2.25}$ |
| Starting materials, moles: | | | | | | |
| $TiCl_4$ b | 1 | 1 | 1 | 1 | 1 | 1 |
| Al c | 4/11 | 0.4 | 4/9 | 4/9 | 1/2 | 7/12 |
| Al/Ti ratio | 4/11 | 0.4 | 4/9 | 4/9 | 1/2 | 7/12 |
| Reaction conditions: | | | | | | |
| 1st period: | | | | | | |
| Max. temp., ° C | 230 | 230 | 220 | 250 | 220 | 220 |
| Time, hours | 3 | 18 | 4 | 14 | 14 | 12 |
| 2nd period: | | | | | | |
| Max. temp., ° C | 220 | 220 | 220 | 220 | 220 | 220 |
| Time, hours | 4 | 16.5 | 4 | 14 | 14 | 12 |
| Yield, g.: | | | | | | |
| Theoretical d | 188 | 178 | 176 | 178 | 178 | 173 |
| Recovered | 177 | 180 | 176 | 172 | 170 | 154 |
| Color of product | (1) | (1) | (1) | (1) | Sepia | (2) |
| Mole ratio in final prod.: $TiCl_n/AlCl_3$ | 1/0.28 | 1/0.24 | 1/0.25 | 1/0.26 | 1/0.23 | 1/0.31 | a 300 ml. rocking bomb was used.
b Stauffer's or Baker's purified.
c Alcoa atomized grade #140.
d Calculated from total charge minus $AlCl_3$ recovered at the top of the bomb. All yields were practically quantitative but losses occurred when removing the reaction product from the bombs.
1 Brownish purple. 2 Blackish brown.

EXAMPLE XVII

In order to demonstrate that the $AlCl_3$ content of a "mixed valence state" $TiCl_n$ catalyst could be reduced even further than shown in the preceding examples, an experiment similar to that in Example XIII was carried out but with the difference that air cooling was applied to the top of the bomb during the last hour of the second reaction period during which the rocker was stopped with the bomb slanting upward. In addition the temperature of the bomb was increased from 220° C. to 370° C. during the last reaction period.

In this way 141 g. of a $TiCl_{2.67}$ preparation was obtained containing only 4.2 mole precent $AlCl_3$.

EXAMPLE XVIII

The following data demonstrate the effect of vacuum sublimation on removing $AlCl_3$ from a reduced $TiCl_4$ system in which aluminum has been used as the reducing agent. Normally 75–100 g. of a starting material, obtained as described in previous examples, was treated under the conditions described in a 1 l. glass or steel bottle equipped with suitable equipment for condensing the vaporized $AlCl_3$.

The results and conditions of treatment were as follows: (The figures preceding $AlCl_3$ refer to molar composition).

*Table II*

VACUUM SUBLIMATION OF $AlCl_3$ FROM $TiCl_n$ PREPARATIONS

| Starting material | Temp., ° C. | Pressure, mm. Hg | Time, hrs. | Product |
|---|---|---|---|---|
| $TiCl_2$—0.51 $AlCl_3$ | 250 | 0.5 | 2 | $TiCl_2$—0.27 $AlCl_3$. |
| $TiCl_2$—0.51 $AlCl_3$ | 400 | 1.0 | 2 | $TiCl_2$—0.01 $AlCl_3$. |
| $TiCl_2$—0.28 $AlCl_3$ | 250 | 1.0 | 5 | $TiCl_2$—0.08 $AlCl_3$. |
| $TiCl_{2.25}$—0.31 $AlCl_3$ | 275 | 1–1.5 | 4 | $TiCl_{2.25}$—0.13 $AlCl_3$. |
| $TiCl_{2.67}$—0.25 $AlCl_3$ | 275 | 0.5 | 4 | $TiCl_{2.67}$—0.09 $AlCl_3$. |
| $TiCl_{2.67}$—0.25 $AlCl_3$ | 360 | 1.0 | 3 | $TiCl_{2.67}$—0.03 $AlCl_3$. |
| $TiCl_{2.8}$—0.24 $AlCl_3$ | 210 | 0.5 | 3 | $TiCl_{2.8}$—0.11 $AlCl_3$. |
| $TiCl_3$—0.33 $AlCl_3$ | 250 | 0.5 | 4 | $TiCl_3$—0.20 $AlCl_3$. |
| $TiCl_3$—0.33 $AlCl_3$ | 350 | 1.0 | 3 | $TiCl_3$—0.07 $AlCl_3$. |

EXAMPLE XIX

The effects of decreasing $AlCl_3$ in $TiCl_3$ catalysts in atmospheric pressure propylene polymerization are shown in Table III. The same polymerization technique was used in all runs, the only difference being the $AlCl_3$ content of the $TiCl_3$ preparation. The basic polymerization procedure was as follows: The desired quantity of $TiCl_3$ catalyst, of $AlEt_3$ and 100 ml. dry xylene were added under mixing to an addition funnel inside a dry box. The mixture was then added to a dry 2 l. glass reactor and stirred under purified nitrogen for 30 minutes at 25–27° C. 400 ml. dry xylene was then added to the reactor and purified (by passing through a BaO tower and three scrubbers containing 25% triisobutyl aluminum in a paraffinic oil) and propylene was introduced at a rate of 1 l./min. The temperature was increased slowly, reaching about 40° C. at 10 min., 60° C. at 20 min. 80° C. at 30 min. and 100° C. at 1 hr. after the start of the propylene feed. The appearance of polymer was observed when the temperature reached about 60° C. The polymerization was continued at 98–100° C. until 2 or 3 hours after introducing the propylene as indicated in Table III. The propylene feed rate was increased during the polymerization if needed for maintaining a positive pressure in the reactor. More xylene diluent was added if needed for maintaining the polymer formed in an easily stirrable slurry. The polymer was recovered by the addition of 2 volumes of isopropanol and filtering at 50° C.

In general, the polymers obtained with aluminum reduced $TiCl_3$ ($AlCl_3/TiCl_3$ ratios of 0.33, 0.2 and 0.11) all had good physical properties. The polymerization rate and catalyst efficiency were, however, higher for the catalysts from which some of the $AlCl_3$ had been removed, the optimum seemed to be in the neighborhood of an $AlCl_3/TiCl_3$ ratio of about 0.2. The mole weight of the polymer also seemed to increase somewhat with decreasing $AlCl_3$ content in the catalyst, although the pure $TiCl_3$ prepared by titanium reduction of $TiCl_4$ at above 500° C. gave a lower mole weight polymer than the preparations previously mentioned. This catalyst showed also much less activity.

The influence of $AlCl_3$ on the mole weight of the polymer was most clearly shown by the use of a 1 $AlCl_3$—1 $TiCl_3$ catalyst which had been prepared at about 200° C. by aluminum reduction of $TiCl_4$ in the presence of a calculated amount of $AlCl_3$. The great decrease in catalyst activity was also apparent in this case and was probably caused in part by reaction between the $AlCl_3$ and the aluminum trialkyl.

continued at 80° C. until 2 hours after the monomer introduction had been started. As in Example XIX the actual polymerization seemed to start shortly before the temperature had reached 60° C. The polymer was then recovered as described previously.

The data in Table IV show that the catalysts with a reduced $AlCl_3$ content gave higher polymerization rates and formed polymers of better physical properties than did the catalyst containing all the $AlCl_3$ formed during the reduction.

*Table IV*

EFFECT OF $AlCl_3$ CONTENT ON CATALYST EFFICIENCY IN PROPYLENE POLYMERIZATION (Atmospheric pressure, toluene diluent)

| Catalyst: | | | |
|---|---|---|---|
| Ti Chloride: | | | |
| Type | $TiCl_{2.8}$—0.24 $AlCl_3$ | $TiCl_{2.67}$—0.25 $AlCl_3$ | $TiCl_{2.67}$—0.44 $AlCl_3$ |
| Weight | 1.74 | 1.76 | 2.01. |
| $AlEt_3$, g | 3.13 | 3.13 | 3.13. |
| $AlEt_3/TiCl_n$ ratio | 2.75 | 2.75 | 2.75. |
| Reaction conditions: | | | |
| Catalyst concn., g./l. (avg.) | 9.8 | 9.8 | 10.3. |
| Polym. temp. range, ° C | 25–80 | 27–80 | 26–80. |
| Avg. polym. temperature, ° C | 72 | 72 | 72. |
| Run length, hrs | 2 | 2 | 2. |
| Results: | | | |
| Yield, g | 41.0 | 39.1 | 33.2. |
| Waxy polymer, percent | 7.8 | 7.8 | 8.1. |
| Catalyst efficiency, g./g | 8.4 | 8.4 | 6.5. |
| Properties of solid polymer: | | | |
| Mol. weight×$10^{-3}$ | 122 | 117 | 96. |
| Density, g./ml | 0.905 | 0.904 | 0.905. |
| Soft. pt./m.p., ° C | 160/163 | 160/163 | 158/162. |
| Tensile strength, p.s.i. | 5,280 | 5,400 | 4,480. |
| Elongation, percent | 30 | 30 | 20. |

*Table III*

EFFECT OF $AlCl_3$ CONTENT ON CATALYST EFFICIENCY IN PROPYLENE POLYMERIZATION (Atmospheric pressure, xylene diluent)

| $AlCl_3/TiCl_3$ mole ratio | 1.0 [a] | 0.33 | 0.20 | 0.11 | 0 [b] |
|---|---|---|---|---|---|
| Reaction conditions: | | | | | |
| $AlEt_3/TiCl_3$ mole ratio | 1.5 | 1.5 | 1.5 | 1.5 | 3 |
| Total weight of catalyst, g | 4.59 | 3.69 | 3.52 | 3.38 | 4.96 |
| Catalyst conc., g./l. (avg.) | 9.2 | 5.9 | 5.3 | 6.0 | 7.9 |
| Polym. temp. range, ° C | 55–100 | 60–100 | 60–100 | 60–100 | 75–130 |
| Avg. polym. temp., ° C | 87 | 88 | 88 | 88 | 108 |
| Run length, hrs | 2 | 2 | 3 | 2 | 8.0 |
| Results: | | | | | |
| Yield, g | 14 | 85.1 | 179.5 | 71.6 | 50 |
| Waxy polymer, percent [c] | 9.8 | 5.5 | 4.8 | 4.6 | 2.0 |
| Catalyst efficiency, g./g | 3.2 | 23.0 | 50.9 | 21.2 | 10.1 |
| Properties of solid polymer: | | | | | |
| Mol. weight×$10^{-3}$ [d] | 48 | 103 | 138 | 140 | 97 |
| Heptane, insolubles, percent [e] | 88.4 | 86.6 | 89.0 | 88.4 | 91 |
| Density, g./ml | 0.915 | 0.903 | 0.900 | 0.900 | |
| Soft. pt./m.p., ° C | 157/160 | 160/165 | 158/166 | 157/165 | |
| Tensile strength, p.s.i. | 1,300 | 4,800 | 5,380 | 5,120 | |
| Elongation, percent | 0 | 10 | 10 | 15 | |

[a] Prepared by aluminum metal reduction of $TiCl_4$ at 200° C. in the presence of separately added $AlCl_3$.
[b] Prepared by titanium metal reduction of $TiCl_4$ at above 500° C.
[c] Low mol. weight primarily amorphous polymer not precipitated by the addition of 2 vol. isopropanol at 50° C.
[d] According to the Harris Correlation (J. Polymer Science, 8, 361, 1952).
[e] Determined by exhaustive Soxhlet extraction with n-heptane.

EXAMPLE XX

The effects of reducing the $AlCl_3$ content of "mixed valence state," $TiCl_n$, catalysts is demonstrated in the experiments reported in Table IV. The same general polymerization technique was used as in Example XIX with some minor changes. Thus toluene was used instead of xylene as the diluent. The temperature increase after the monomer feed had been started was also slightly different, 44° C. being reached after 10 min., 58° C. after 20 min., and 80° C. after 35 min. The polymerization was then

EXAMPLE XXI

The effect of reducing the $AlCl_3$ content of a $TiCl_2$ catalyst prepared by aluminum metal reduction of $TiCl_4$ is demonstrated in the polymerization experiments reported in Table V. The polymerizations were carried out at elevated pressure in 300 ml. Aminco steel bombs because of the usually low activity exhibited by $TiCl_2$ catalysts at atmospheric pressure.

The polymerization procedure was as follows. The catalyst was charged to the bombs in a dry box containing purified nitrogen in the following manner. The weighed titanium halide was suspended in 30 ml. dry n-heptane and the desired amount of $AlEt_3$ was added as a 0.88 molar solution in n-heptane to the suspension. The catalyst suspension was then transferred to the bomb, which was then closed and transferred to a heating rocker and connected to the propylene feed system. 100 g. of purified (by passing through a BaO tower and a scrubber containing 25% triisobutyl aluminum in a paraffin oil) propylene was condensed in an intermediate bomb using a Dry Ice-isopropanol bath as the cooling medium. The accuracy of the metering system used for the propylene condensation was about ±5%. The condensed propylene was introduced into the bomb with nitrogen gas and pressured up to 400 p.s.i.g. to insure complete monomer transfer. Heat was then applied to the rocker and the rocker motor started. The temperature of the bomb was allowed to rise to 80° C. This took about 0.5–1 hour somewhat depending upon the rate of reaction. The bomb was then kept at this temperature for 7 hours. Although the actual polymerization time was much shorter as evidenced by the time pressure relationship in the bombs, the longer reaction time was used in order to realize the full potentialities of the catalysts. The bombs were then allowed to cool, removed from the rockers, opened and the polymer recovered in a manner previously described.

The superiority of the $TiCl_2$—0.08 $AlCl_3$ over the $TiCl_2$—0.67 $AlCl_3$ catalyst from which no $AlCl_3$ has been removed is quite apparent. Whereas the first catalyst gives a large portion of very high molecular weight solid polymer of very good physical properties, the second catalyst gives lower over-all polymer yields containing only traces of solid polymer, the main product being a "waxy" or in this case rather an oily polymer.

to be the highest ever reported for polymerization of propylene with any similar catalyst system.

Table VI

POLYMERIZATION OF PROPYLENE WITH ALUMINUM REDUCED TiCl$_n$ CATALYSTS AFTER PARTIAL AlCl$_3$ REMOVAL
(1 l. rocking bomb)

| Catalyst: | | | | |
|---|---|---|---|---|
| Titanium halide: | | | | |
| Type | TiCl$_{2.8}$—0.24 AlCl$_3$ | TiCl$_{2.67}$—0.25 AlCl$_3$ | TiCl$_{2.67}$—0.26 AlCl$_3$ | TiCl$_{2.5}$—0.23 AlCl$_3$ |
| Weight, mg | 44.9 | 44.2 | 25.9 | 57.1 |
| AlEt$_3$, mg | 200 | 200 | 100 | 200. |
| AlEt$_3$/TiCl$_n$ ratio | 6.9 | 7.0 | 6.0 | 5.1. |
| Feed and diluent comp.: | | | | |
| Propylene, g.ª | 200 | 230 | 200 | 200. |
| n-Heptane, ml | 50 | 50 | 50 | 50. |
| Reaction conditions: | | | | |
| Catalyst concn., g./l | 0.61 | 0.54 | 0.31 | 0.64. |
| Avg. temperature, °C | 80 | 80 | 80 | 80. |
| Run length, hrs.ᵇ | 8 | 12 | 12 | 6. |
| Results: | | | | |
| Total polymer, g | 169 | 224 | 134 | 199. |
| Waxy polymer, percent | 1.6 | 1.8 | 2.0 | 0.15. |
| Catalyst efficiency, g./g.: | | | | |
| On total catalyst | 690 | 915 | 1,060 | 780. |
| On TiCl$_n$ | 4,560 | 6,250 | 6,400 | 4,410. |
| Prop. of solid polymer: | | | | |
| Mol. weight×10⁻³ | 170 | 314 | 254 | 250. |
| Heptane insolubles, percent | 65.5 | 63.8 | 64.0 | 60.8. |
| Soft. pt./m.p., °C | 149/163 | 149/160 | 153/170 | 145/162. |
| Tensile strength, p.s.i | 3,010 | 2,540 | 2,250 | 2,120. |
| Elongation, percent | 70 | 120 | 90 | 235. |

ª Measured by pressure drop as propylene condensed and therefore an approximate weight.
ᵇ The actual polymerization time was usually much shorter than the time used.

Table V

EFFECT OF AlCl$_3$ CONTENT ON CATALYST EFFICIENCY IN PROPYLENE POLYMERIZATION
(300 ml. rocking bomb)

| Catalyst: | | |
|---|---|---|
| Titanium halide: | | |
| Type | TiCl$_2$—0.08 AlCl$_3$ | TiCl$_2$—0.67 AlCl$_3$ |
| Weight, mg | 500 | 805. |
| AlEt$_3$, mg | 725 | 725. |
| AlEt$_3$/TiCl$_2$ ratio | 1.65 | 1.65. |
| Feed and diluent components: | | |
| Propylene, g.ª | 100 | 100. |
| n-Heptane, ml | 30 | 30. |
| Reaction conditions: | | |
| Catalyst concn., g./l | 6.1 | 7.6. |
| Avg. temperature, °C | 80 | 80. |
| Run length, hrs.ᵇ | 7 | 7. |
| Results: | | |
| Total polymer, g | 31 | 27. |
| Waxy polymer, percent | 23 | 97. |
| Catalyst efficiency, g./g | 24.4 | 17.6. |
| Properties of solid polymer: | | |
| Mol. weight×10⁻³ | 450 | 120. |
| Heptane insolubles, percent | 92.8 | |
| Soft. pt./m.p., °C | 164/180 | |
| Tensile strength, p.s.i | 4,930 | |
| Elongation, percent | 0 | |

ª Measured by pressure drop as propylene condensed and thereforean approximate weight.
ᵇ The actual polymerization time was usually much shorter than the time used.

EXAMPLES XXII–XXV

That very high catalyst efficiencies can be obtained with catalysts prepared according to this invention is shown by the data from four propylene polymerizations shown in Table VI.

The general polymerization technique in these experiments was the same as described in Example XXI although 1 l. bombs were used instead of 300 ml. bombs. The amount of n-heptane used for slurrying the catalyst as well as the amount of monomer charged were changed accordingly as indicated in Table VI. As complete conversion of the propylene charged was obtained in polymerizations where moderate catalyst concentrations were used, it was necessary to use very low catalyst concentrations in order to realize the full potentialities of the extremely active TiCl$_n$—$x$AlCl$_3$ catalysts. High AlEt$_3$/TiCl$_n$ ratios had to be used in order to prevent inactivation of the catalysts by traces of poisons, air and moisture in particular. Under these conditions the variation in the amount of TiCl$_n$ used has a great influence on the total catalyst efficiency. The catalyst efficiency calculated on the TiCl$_n$ portion of the catalyst is, however, not influenced thereby. Therefore the latter values become the most significant ones. Even so, the over-all catalyst efficiencies of up to over 1000 g./g. are believed

EXAMPLE XXVI

The ability of a catalyst prepared according to this invention to polymerize other olefins than propylene was demonstrated in the following manner: 1.76 g. of a TiCl$_{2.67}$—0.25 AlCl$_3$ catalyst and 3.13 g. AlEt$_3$ were mixed under inert conditions in 100 ml. xylene. The mixture was added to a nitrogen filled dry glass reactor, and stirred at room temperature for 30 min. 400 ml. dry xylene was then added to the reactor, and thoroughly scrubbed (ascarite, Drierite and Al(i-Bu)$_3$ scrubbers) ethylene introduced into the reactor at a rate of 1000 ml./min. under continued stirring. The temperature was raised slowly by heating. 52° C. was reached after 10 min. and 65° C. after 20 min. When necessary the propylene feed was increased to 1500 ml./min. The polymerization was allowed to continue at 65° C. until 2 hrs. after the ethylene feed was started. At this time the catalyst was destroyed by the addition of 2 vol. of isopropanol. The polymer-alcohol-diluent mixture was stirred at 70° C. for 10 minutes. The polymer was then filtered off at 50° C. After a second washing with 1 volume (calculated on original diluent volume) isopropanol, 91 g. of a white, fine granular, solid polyethylene was obtained. It had an intrinsic viscosity of 7.12 corresponding to a mol. wt. of 810,000 according to the Harris correlation. Its softening point/melting point was 149/157° C.

EXAMPLE XXVII

The general usefulness of a catalyst prepared according to this invention for polymerization of higher alpha-olefins was further demonstrated in the following experiment in which butene-1 was polymerized to a solid white, plastic material.

The catalyst was prepared and pretreated as in the foregoing example. 400 ml. of xylene was then added to the reactor and thoroughly scrubbed butene-1 introduced into the reactor at a rate of 1000 ml./min. The temperature was raised slowly reaching 78° C. at 30 min., 91° C. at 60 min. and 108° C. at 120 min. in the reaction. The polymerization was terminated after 120 min. and the polymer recovered as in preceding example. 6.1 g. of solid polybutene-1 having an intrinsic viscosity of 1.57 was recovered. The material softened at 95° C. and melted at 103° C. It had a high degree of crystallinity as evidenced by its X-ray diffraction pattern.

The advantages of this invention will be apparent to the skilled in the art. Greater catalyst efficiency and activity are obtained in an economical manner.

It is to be understood that this invention is not limited to the specific examples which have been offered merely as illustrations and that modifications may be made without departing from the spirit of the invention.

What is claimed is:

1. In the preparation of a catalyst composition by the reduction of a titanium halide to a lower valence state with a finely divided aluminum powder at a temperature of 150° to 500° C., a pressure in the range of 0 to 500 p.s.i.g. and in an inert atmosphere, the improvement which comprises at least partially removing the resultant aluminum halide from the reaction mixture and admixing the reduced titanium halide with an aluminum trialkyl.

2. The process of claim 1 in which the aluminum halide formed is removed by purging the reaction mixture with an inert gas.

3. The process of claim 1 in which the aluminum halide formed is removed by extraction with an organic solvent.

4. The process of claim 1 in which the aluminum halide formed is removed by stripping at a reduced pressure.

5. The process of claim 1 in which the titanium halide is $TiCl_4$.

6. A method according to claim 1 in which the aluminum halide formed from the reducing element is removed directly after the reduction.

7. A method according to claim 1 in which the aluminum halide formed from the reducing element is removed during the reduction.

References Cited in the file of this patent

UNITED STATES PATENTS

| 2,745,735 | Byrns | May 15, 1956 |
| 2,770,541 | Singleton | Nov. 13, 1956 |
| 2,880,199 | Jezl | Mar. 31, 1959 |

FOREIGN PATENTS

| 1,119,820 | France | Apr. 9, 1956 |
| 757,873 | Great Britain | Sept. 26, 1956 |

OTHER REFERENCES

Barksdale: "Titanium," p. 81, Ronald Press Co., New York (1949).

Notice of Adverse Decision in Interference

In Interference No. 93,399 involving Patent No. 3,001,951, E. Tornqvist and A. W. Langer, Jr., PREPARATION OF CATALYST WITH REMOVAL OF HALIDE, final judgment adverse to the patentees was rendered Aug. 18, 1965, as to claims 1, 3, 4, 5 and 6.

[*Official Gazette September 28, 1965.*]